United States Patent
Charbonnier

(10) Patent No.: US 8,998,510 B2
(45) Date of Patent: Apr. 7, 2015

(54) METHOD FOR ALIGNING AND FASTENING AN OPTICAL FIBER COUPLED TO AN OPTO-ELECTRONIC COMPONENT

(75) Inventor: Philippe Charbonnier, Marcoussis (FR)

(73) Assignee: Alcatel Lucent, Boulogne-Billancourt (FR)

( * ) Notice: Subject to any disclaimer, the term of this patent is extended or adjusted under 35 U.S.C. 154(b) by 144 days.

(21) Appl. No.: 13/806,484

(22) PCT Filed: Jul. 1, 2011

(86) PCT No.: PCT/EP2011/061104
§ 371 (c)(1), (2), (4) Date: Jan. 22, 2013

(87) PCT Pub. No.: WO2012/001143
PCT Pub. Date: Jan. 5, 2012

(65) Prior Publication Data
US 2013/0121642 A1    May 16, 2013

(30) Foreign Application Priority Data
Jul. 2, 2010 (FR) .................................. 10 55356

(51) Int. Cl.
G02B 6/42 (2006.01)
G02B 6/36 (2006.01)

(52) U.S. Cl.
CPC ................ *G02B 6/42* (2013.01); *G02B 6/4239* (2013.01); *G02B 6/3636* (2013.01)

(58) Field of Classification Search
None
See application file for complete search history.

(56) References Cited

U.S. PATENT DOCUMENTS

| 4,784,458 | A | | 11/1988 | Horowitz et al. | |
|---|---|---|---|---|---|
| 4,930,854 | A | | 6/1990 | Albares et al. | |
| 5,007,700 | A | | 4/1991 | Albares | |
| 5,553,182 | A | * | 9/1996 | Haake | 385/89 |
| 6,130,444 | A | * | 10/2000 | Hashizume et al. | 257/81 |
| 6,282,350 | B1 | * | 8/2001 | Takahashi et al. | 385/88 |

(Continued)

FOREIGN PATENT DOCUMENTS

| EP | 1477835 A1 | 11/2004 |
|---|---|---|
| JP | 2004177606 A | 6/2004 |

OTHER PUBLICATIONS

International Search Report PCT/ISA/210 for International Application No. PCT/EP2011/061104 dated Oct. 18, 2011.

*Primary Examiner* — Mike Stahl
(74) *Attorney, Agent, or Firm* — Harness, Dickey & Pierce

(57) ABSTRACT

It is an object of the present invention to have a method for aligning the optical axis of an optical fiber with the optical axis of an opto-electronic component and for fastening the optical fiber into the resulting relative position in relation to the opto-electronic component. This method includes the following steps:
  a slot is cut into a base,
  an optical fiber is disposed within the slot so that it touches neither the sides nor the bottom,
  a solidifiable product is deposited onto the optical fiber,
  a limited polymerization area of the solidifiable product is defined near the opto-electronic component,
  one part of the solidifiable product is partially solidified so as to allow the optical fiber a limited range of movement,
  the optical fiber is moved so as to align its optical axis with the optical axis of the opto-electronic component,
  the solidifiable product is completely solidified so as to fasten the optical fiber within the slot.

7 Claims, 6 Drawing Sheets

(56) References Cited

U.S. PATENT DOCUMENTS

Figure 1:
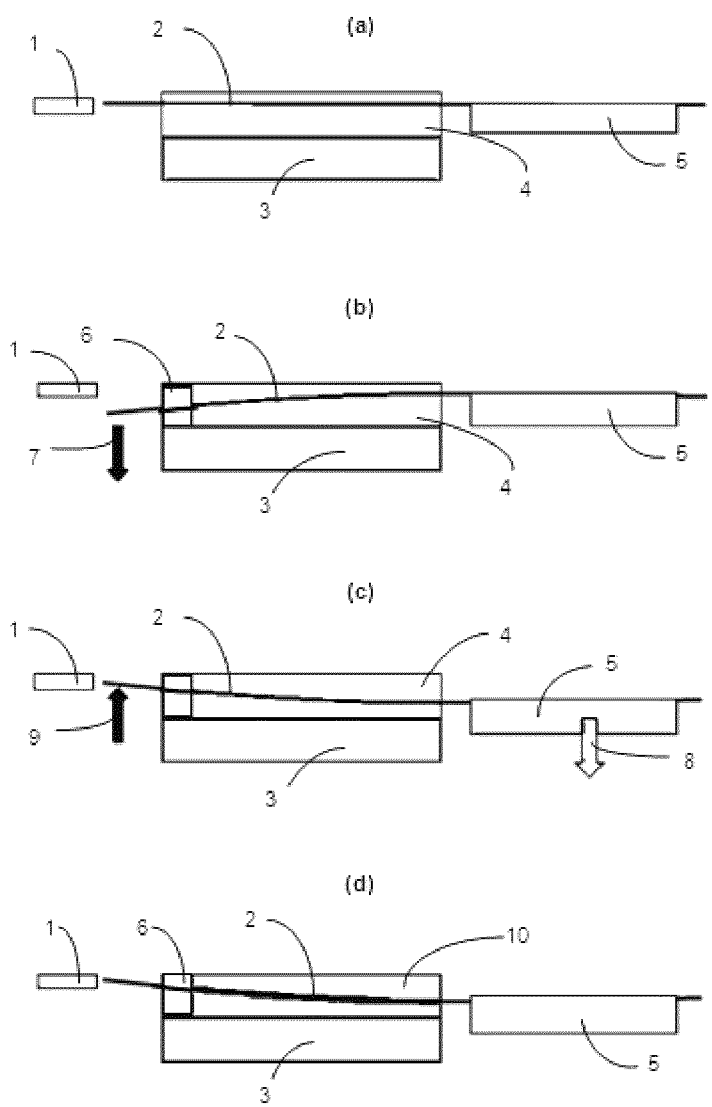

| | | |
|---|---|---|
| 6,597,843 B2 * | 7/2003 | Johnson .......................... 385/52 |
| 6,910,811 B2 * | 6/2005 | Amorim .......................... 385/90 |
| 8,632,262 B2 * | 1/2014 | Delianides et al. ............. 385/88 |
| 2001/0024549 A1 | 9/2001 | Takahashi et al. |
| 2004/0042730 A1 * | 3/2004 | Freund et al. ................... 385/52 |
| 2004/0228580 A1 | 11/2004 | Lee et al. |
| 2008/0144998 A1 * | 6/2008 | Melville et al. ................. 385/51 |
| 2011/0051454 A1 * | 3/2011 | Wolf et al. ..................... 362/553 |

* cited by examiner (a)

(b)

(c)

METHOD FOR ALIGNING AND FASTENING AN OPTICAL FIBER COUPLED TO AN OPTO-ELECTRONIC COMPONENT

CROSS-REFERENCE

This application is based on French Patent Application No. 10 55 356 filed on Jul. 2, 2010, the disclosure of which is hereby incorporated by reference thereto in its entirety, and the priority of which is hereby claimed under 35 U.S.C. §119.

TECHNICAL FIELD

The present invention pertains to a method for aligning the optical axis of an optical fiber with the optical axis of an opto-electronic component and for fastening the optical fiber into a coupling position with the opto-electronic component. This method also applies to situations in which the opto-electronic component is coupled to multiple optical fibers.

BACKGROUND

The active opto-electronic components concerned by the invention are light-producing or light-detecting components which may be coupled to conductors of integrated circuits. The opto-electronic component may particularly be a semiconductor component, a laser diode, a light-emitting diode, a photodiode, or a phototransistor, for example. In order to associate this opto-electronic component with an optical fiber with optimal coupling, it is necessary to align the optical axis of the optical fiber on the optical axis of the opto-electronic component with extreme accuracy. However, due to the very small dimensions of the opto-electronic components, adjusting the alignment of the optical axes of the optical fiber and opto-electronic component is a very delicate operation, because in some cases it requires accuracy on the order of or greater than 1 µm in all three axes. This is why this alignment is generally adjusted dynamically, and the optical fiber moved with a micromanipulator is adjusted in position, with the opto-electronic device being operating.

The quality of the resulting coupling, meaning the ratio of the signal transferred by the coupling over the signal transmitted by the input optical fiber in the event of input coupling, is higher if the positioning of the optical fiber's end relative to the opto-electronic component is well-adjusted. In practice, this requires very accurate positioning of the optical fiber relative to the opto-electronic component. The optical fiber's position relative to the opto-electronic component must then remain optimal while fastening the optical fiber onto its mount.

One known method is based on moving the optical fiber along three orthogonal axes, one of which is parallel to the optical axis of the opto-electronic component and the other two of which are perpendicular to that same axis: the adjustment is therefore performed in a system of Cartesian coordinates. When the alignment is obtained, the parts are fixed in place by laser welding. The drawback of this method is that it requires precision-machined smooth surfaces, which makes it expensive.

To remedy this drawback, it has been proposed to use polar coordinates. The opto-electronic component is fastened on a base that comprises grooves, and the optical fiber is held between plates resting on those grooves.

To remedy this drawback, it has also been proposed to have a device using lower-precision parts, the optical fiber being tilted and moved in order to obtain optimal coupling. The opto-electronic component is fastened on a base that comprises a slot, and the optical fiber is locked in place by a keyhole-shaped pincher whose tips are inserted into the slot.

Another method consists of moving the optical fiber, placed facing the opto-electronic component, within a solidifiable product. This solidifiable product is either melted soft solder, or polymerizing glue. The optical fiber's position is adjusted until the maximum transferred signal is obtained, then the product is solidified when optimal coupling is reached; in this matter, it is fastened into an appropriate position. The drawback of this method is that while the product is solidifying, forces of contraction move the optical fiber and may sometimes even break it. In order to keep from reducing the coupling, the movement caused by the shrinkage is anticipated when positioning the optical fiber relative to the opto-electronic component. Nonetheless, shrinkage is not always foreseeable, and the resulting alignment does not have the required accuracy.

SUMMARY

The coupling of an optical fiber with an opto-electronic component is therefore not an easy task. This is because the alignment of the optical fiber with the opto-electronic component must be such that maximum light coupling exists between the opto-electronic component and the optical fiber. Furthermore, this coupling must be solid and maintain optimal alignment over time, despite changes in temperature and humidity. Furthermore, the coupling must tolerate handling, or even a decrease in the level of coupling.

The purpose of the present invention is to propose a method for accurately aligning and fastening the optical axis of an optical fiber with the optical axis of an opto-electronic component.

It is an object of the present invention to provide a method for aligning the optical axis of an optical fiber with the optical axis of an opto-electronic component and for fastening the resulting relative position of the optical fiber in relation to the opto-electronic component.

According to the invention, the method comprises the following steps:
- a slot is cut into a base,
- an optical fiber is disposed within the slot so that it touches neither the sides nor the bottom,
- a solidifiable product is deposited onto the optical fiber,
- a limited polymerization area of the solidifiable product is defined near the opto-electronic component,
- one part of the solidifiable product, corresponding to the limited polymerization area, is partially solidified so as to allow the optical fiber a limited range of movement,
- the optical fiber is moved so as to align its optical axis with the optical axis of the opto-electronic component,
- the solidifiable product is completely solidified so as to fasten the optical fiber within the slot.

Preferentially, the solidifiable product contains a photopolymerizable monomer. Even more preferentially, the product is solidifiable when subjected to ultraviolet radiation.

According to a first embodiment of the invention, the method comprises the following steps:
- a small quantity of the solidifiable product is deposited on an end portion of the optical fiber disposed within the slot,
- the part of the solidifiable product thereby deposited is partially solidified so as to allow the optical fiber a limited range of movement,
- the optical fiber is moved so as to align its optical axis with the optical axis of the opto-electronic component, once alignment is complete, the slot is filled with solidifiable product, and the product is completely solidified so as to fasten the optical fiber in the slot.

According to a second embodiment of the invention, the method comprises the following steps:

the slot is filled with solidifiable product, a mask is deposited onto the solidifiable product, the part of the solidifiable part that is not masked is partially solidified so as to allow the optical fiber a limited range of movement, the optical fiber is moved so as to align its optical axis with the optical axis of the opto-electronic component, once alignment is complete, the mask is removed, and the solidifiable product is completely solidified so as to fasten the optical fiber in the slot.

The advantage of this method is to partially polymerize the polymer in a limited area in order to constitute a swivel joint, in the advanced part of the optical fiber, close to the opto-electronic component, which secures and makes more accurate the alignment of the optical fiber with the opto-electronic component. This swivel joint allows the optical fiber to move in three dimensions. In order to retain its full freedom of movement, the optical fiber must not be in contact with the bottom or sides of the slot. Because the optical fiber will be fastened without any contact with a side, it is preferable to minimize the thickness of the polymerizable product surrounding the optical fiber in order to reduce the problem posed by potential shrinking due to full polymerization.

The limited area may be obtained either by depositing only the quantity of product needed to define that area, or by liberally depositing the polymerizable product and masking the part that is not meant to be polymerized. The polymerizable product found within the area thereby delimited is subject to partial polymerization.

A further object of the invention is a device for aligning the optical axis of an optical fiber with the optical axis of an opto-electronic component fastened onto a base and for fastening the optical fiber into the resulting relative position in relation to the opto-electronic component, in order to implement the method described above.

Within the device, a slot and a groove are cut into the base, the groove being orthogonal to the slot and the depth of the groove being greater than that of the slot.

A UV-transparent plate is placed on the base above the slot, once the optical fiber has been immersed in the solidifiable product, in order to balance the effects of shrinking along the vertical axis. The optical fiber is then surrounded by four sides, which keeps it in position.

In one variant, two grooves are also cut parallel to the slot, the grooves respectively being disposed on either side of the slot.

BRIEF DESCRIPTION

Figure 2:
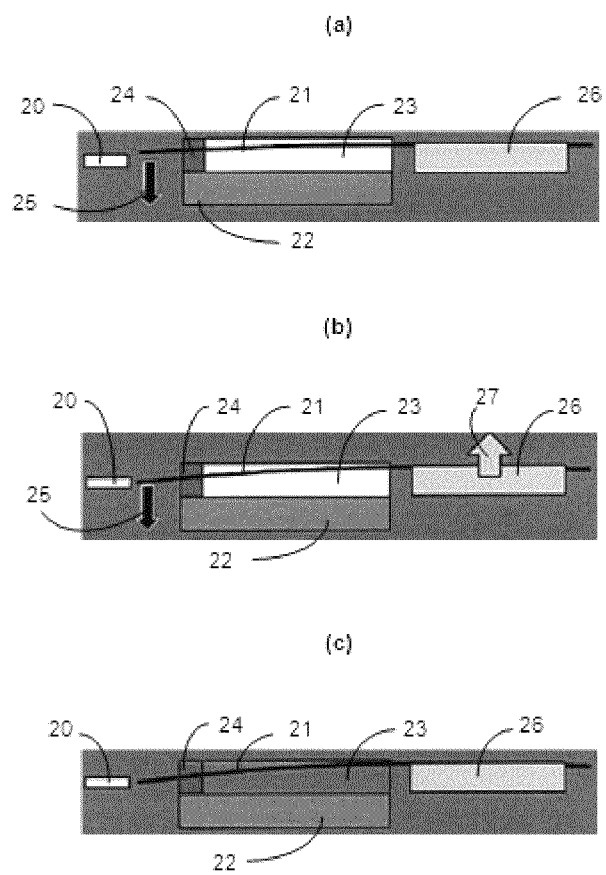
Figure 3:
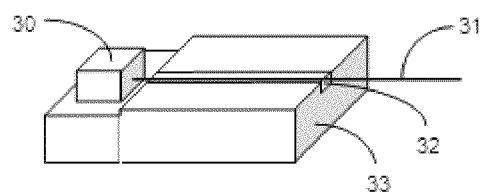
Figure 4:
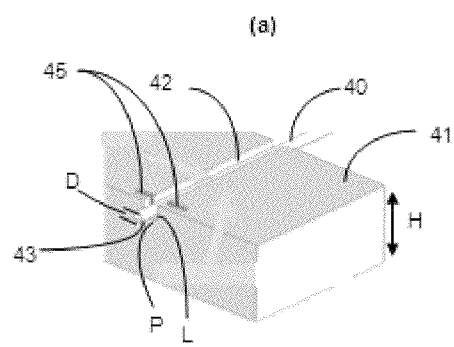
Figure 4:
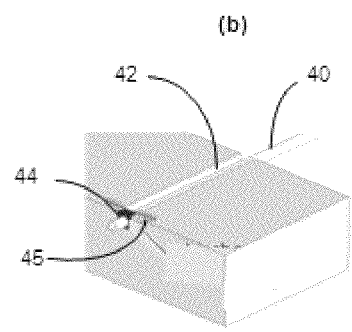
Figure 4:
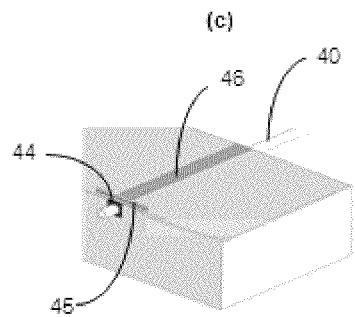
Figure 5:
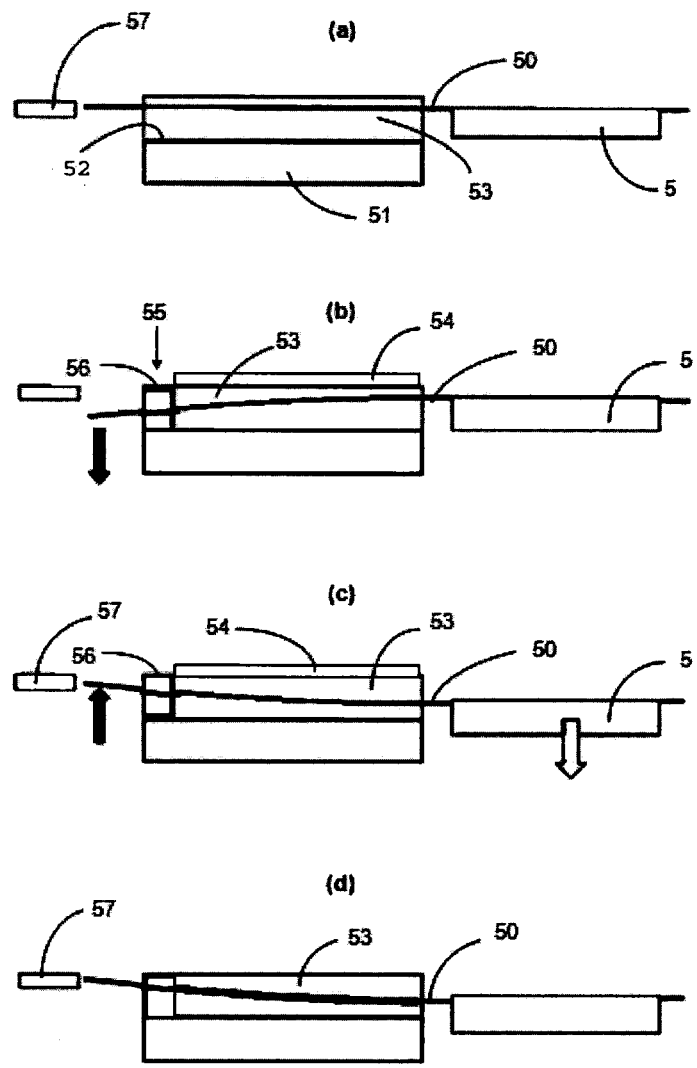
Figure 6:
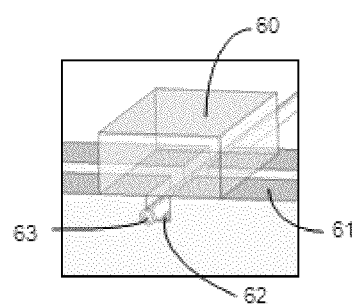
Figure 7:
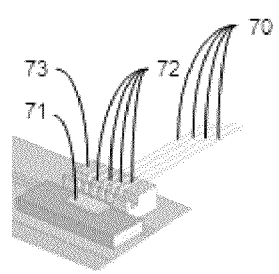

Other characteristics and advantages of the present invention will become apparent upon reading the following description of embodiments, which are naturally given by way of non-limiting examples, and in the attached drawing, in which:

FIGS. 1a to 1d are schematic views showing a first embodiment of the steps of aligning an optical fiber relative to an opto-electronic component according to the inventive method, FIGS. 2a, 2b, and 2c are schematic views showing a second embodiment of the steps of aligning an optical fiber relative to an opto-electronic component according to the inventive method, FIG. 3 schematically depicts an alignment of an optical fiber in relation to an opto-electronic component once completed according to the inventive method, FIGS. 4a to 4c are schematic perspective views showing a third embodiment of the steps of aligning the optical fiber relative to an opto-electronic component according to the inventive method, FIGS. 5a to 5d are schematic views showing a fourth embodiment of the steps of aligning the optical fiber relative to an opto-electronic component according to the inventive method, FIG. 6 is a schematic perspective view showing a variance embodiment of aligning an optical fiber relative to an opto-electronic component according to the inventive method, FIG. 7 is a schematic perspective view showing an embodiment of the simultaneous alignment of multiple optical fibers relative to an opto-electronic component according to the inventive method.

Figure 8:
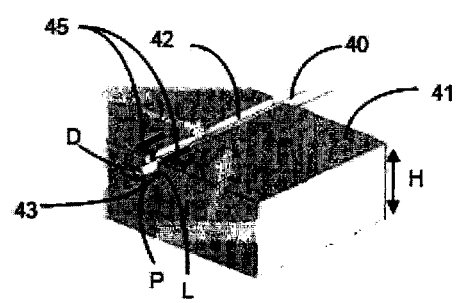

FIG. 8 is a schematic perspective view of an embodiment of an optical fiber in a slot with two grooves included parallel to the slot.

DETAILED DESCRIPTION

FIG. 1a depicts an opto-electronic component 1 which may be a light-producing or light-detecting component, for example a laser diode, and an optical fiber 2, which must be coupled together. The optical fiber 2 rests on a base 3 within which a slot 4 has been cut. The base 3 can also support the opto-electronic component 1. The optical fiber 2 is placed within the slot 4 so that it touches neither the sides near the bottom, and so that it extends slightly past the adjacent end of the opto-electronic component 1, and further past the opposite end. A micromanipulator tool 5 holds the outward-extended end of the optical fiber 2 opposite the opto-electronic component 1, close to the base 3 (for example 1 or 2 mm), and thereby makes it possible to move it.

In FIG. 1b, a small quantity of a solidifiable product 6, such as a glue that can be photopolymerized, for example when exposed to ultraviolet radiation, has been deposited into the slot 4. Depositing the dab 6 of the glue onto an end portion of the optical fiber 2 causes the optical fiber 2 to move 7. The glue 6 is then partially polymerized so as to thicken without solidifying, in order to allow the optical fiber 2 to move under the effect of the force exerted by the micromanipulator tool 5.

Once the swivel joint has been constituted in this way, the portion of the fiber located near the opto-electronic component is capable of describing within space a motion along three axes, which is proportional to the motion imposed by the micromanipulator tool 5 placed at the end opposite the slot. The result is a lever that affects the accuracy of the fiber's positioning.

Owing to the action 8 of the tool 5, the optical fiber 2 is moved in the direction 9 opposite its previous movement 7, as shown in FIG. 1c, until it has achieved optimal coupling with the opto-electronic component 1, aligning its optical axis with the optical axis of the opto-electronic component 1.

Once the optical fiber 2 is in place and is being held there by the dab 6 of semi-polymerized glue, the slot 4 is filled with an additional quantity of glue 10 (FIG. 1d). All of the glue 6, 10 is then fully polymerized under the effect of UV radiation. The optical fiber 2 is left in a lasting position of optimal coupling, and is solidly fastened onto the base 3.

The embodiment of the invention depicted in FIGS. 1a to 1d correspond to the situation in which the expected shrinkage was less than or equal to the shrinkage that actually occurred.

FIGS. 2a to 2c show a second embodiment in the situation in which the expected shrinkage was greater than the actual shrinkage. An opto-electronic component 20 and an optical fiber 21 are depicted, both resting on of base 22 into which a slot 23 has been cut. Into the slot 23, a small quantity of polymerizable product 24 has been deposited, which causes the optical fiber 21 to move 25. The solidifiable product 24 is then partially polymerized in order to allow the optical fiber 21 to be moved by the micromanipulator tool 26.

By the action 27 of the tool 26, the optical fiber 21 is moved in the same direction as its previous motion 25, as shown in FIG. 2c, until optimal coupling with the opto-electronic component 20 has been achieved, aligning its optical axis with the optical axis of the opto-electronic component 20.

FIG. 3 schematically depicts an opto-electronic component 30 coupled with an optical fiber 31 disposed within the slot 32 cut into a base 33. In the situation depicted here, the opto-electronic component 30 rests on the same base as the fiber 31.

FIGS. 4a to 4c show in perspective view the steps of fastening the optical fiber 40 onto the base 41 according to one embodiment of the inventive method.

First (FIG. 4a), the optical fiber 40 is deposited into the slot 42 cut into the base 41, which can also support an opto-electronic component (not depicted), so as to allow the end of the optical fiber 40 adjacent to the opto-electronic component to extend 43 slightly past it. The optical fiber 40 is formed of a core surrounded by optical cladding, and its diameter D is about 125 .mu.m. The base 41 has a height H of about 2 mm. The slot 42 with a width L and a depth P on the order of 200 .mu.m has been cut into the base 41 formed of an appropriate material such as a ceramic, a polymer material, an optical substrate material (borosilicate, silicon, etc.).

As shown in FIG. 4b, a dab 44 of a glue containing a material that polymerizes in ultraviolet radiation or by a thermal effect is deposited into the slot 42. Preferentially, a low-shrinkage glue which does not release any gas while polymerizing is used. For example, a one-part epoxy glue may be used. The glue is partially polymerized so as to grant it a viscous consistency, comparable to a thick jam, which allows the optical fiber 40 a limited range of movement if sufficient force is exerted onto it, but which prevents it from moving freely.

In order to keep this dab of glue 44 from being spread in an unwanted way, a groove 45 may be cut in a direction perpendicular to the slot 42, having a depth P' greater than the depth P of the slot 42. This groove 45 is cut into the junction between the first dab of glue and the rest of the glue added afterward. This groove's function is to delimit two separate areas: a first area close to the opto-electronic component, where some of the polymerizable product that will be partially polymerized to constitute the swivel joint will be deposited, and an area far from the opto-electronic component that will receive the additional polymerizable product in order to permanently fasten the optical fiber into the precise alignment position once the polymerizable product has fully polymerized.

According to a variant not depicted, two grooves may be cut parallel on either side of the slot. These side grooves contribute to delimiting the area in which the solidifiable product is deposited.

Once the optical fiber 40 has been installed in the position at which the coupling with the opto-electronic component is optimal, it is kept in place by the partially polymerized dab of glue 44. Glue 46 may therefore be added in such a way as to immerse the optical fiber as shown in FIG. 4c, and the assembly may be submitted to UV radiation that will complete the polymerization of that first dab of glue 44 and will completely polymerize the glue added afterwards 46.

We shall now consider FIGS. 5a to 5d that illustrate the steps of fastening an optical fiber 50 onto a base 51 according to another embodiment of the inventive method.

In FIG. 5a, the optical fiber 50 rests on a slot 52, cut into the base 51, which is filled with a solidifiable product 53.

Next, a mask 54 is deposited on the solidifiable product 53, as shown in FIG. 5b. UV radiation 55 is then sent which acts on the area 56 that is not protected by the mask 54 so as to partially solidify the solidifiable product 53 in this area 56 in order to allow the optical fiber 50 a limited range of movement, Under the action of the tool 5, the optical fiber 50 is moved in such a way as to align its optical axis with the optical axis of the opto-electronic component 57, as shown in FIG. 5c, until optimal coupling with the opto-electronic component 57 is achieved.

Finally, the mask 54 is removed (FIG. 5d) and the UV radiation that is sent allows a full solidification of the solidifiable product 53 so as to fasten the optical fiber 50 in the desired position.

In FIG. 6, a UV-transparent plate 60 has been placed on the base 61 above the slot 62 containing the optical fiber 63 immersed in a polymerizable glue under the effect of UV radiation. This plate 60 makes it possible to balance the shrinkage forces along the vertical axis.

In the event that multiple optical fibers 70 must be coupled with the same opto-electronic component 71, a plurality of parallel slots 72 are cut into a base 73 so that each optical fiber 70 is deposited into its own slot 72, as shown in FIG. 7. Each optical fiber 70 is then individually aligned with the opto-electronic component 71 according to one of the previously described embodiments.

Naturally, the present invention is not limited to the described embodiments, but rather is subject to many variants accessible to the person skilled in the art without departing from the spirit of the invention. In particular, without departing from the scope of the invention, it is possible to conceive the usage of solidifiable products of different structures and natures.

The invention claimed is:

1. A method for aligning the optical axis of an optical fiber with the optical axis of an opto-electronic component and for fastening the optical fiber into the resulting relative position in relation to the opto-electronic component, wherein
    a slot is cut into a base,
    an optical fiber is disposed within the slot so that it touches neither the sides nor the bottom,
    a solidifiable product is deposited onto the optical fiber,
    a limited polymerization area of the solidifiable product is defined near the opto-electronic component,
    one part of the solidifiable product is partially solidified so as to allow the optical fiber a limited range of movement,
    the optical fiber is moved so as to align its optical axis with the optical axis of the opto-electronic component,
    the solidifiable product is completely solidified so as to fasten the optical fiber within the slot.

2. An aligning and fastening method according to claim 1, wherein the solidifiable product contains a photopolymerizable monomer.

3. An aligning and fastening method according to claim 1, wherein a small quantity of the solidifiable product is deposited on an end portion of the optical fiber disposed within the slot, the part of the solidifiable product thereby deposited is partially solidified so as to allow the optical fiber a limited range of movement, once alignment is complete, the slot is filled with solidifiable product, and the product is completely solidified so as to fasten the optical fiber in the slot.

4. An aligning and fastening method according to claim 2, wherein:

the slot is filled with solidifiable product, a mask is deposited onto the solidifiable product, the part of the solidifiable part that is not masked is partially solidified so as to allow the optical fiber a limited range of movement, once alignment is complete, the mask is removed, and the solidifiable product is completely solidified so as to fasten the optical fiber in the slot.

5. An aligning and fastening method according to claim 1, wherein the product is solidifiable under the action of ultraviolet radiation.

6. A device for aligning the optical axis of an optical fiber with the optical axis of an opto-electronic component and for fastening the optical fiber in the resulting relative position in relation to the opto-electronic component, for the implementation of the method according to one of the previous claims, the device comprising:

a slot; and a groove being cut into a base, the groove being orthogonal to the slot and the depth of the groove being greater than that of the slot wherein a UV-transparent plate is placed on the base above the slot, once the optical fiber has been immersed in the solidifiable product.

7. A device according to claim 6, wherein two grooves are additionally cut parallel to the slot, the grooves being respectively disposed on either side of the slot.

* * * * *